United States Patent [19]
Vick, Jr.

[11] Patent Number: 4,772,072
[45] Date of Patent: Sep. 20, 1988

[54] DUMP BODY DEBRIS CATCHER

[76] Inventor: Henry L. Vick, Jr., 24-7 Westchester Ct., Birmingham, Ala. 35215

[21] Appl. No.: 104,163

[22] Filed: Oct. 5, 1987

[51] Int. Cl.$^4$ ............................................. B60P 1/28
[52] U.S. Cl. ...................................... 298/7; 222/108; 239/122; 296/38; 296/184; 298/1 R; 298/23 R
[58] Field of Search .................. 298/1 R, 7, 23 R, 26; 296/38, 57 R, 61, 184; 239/121, 122; 222/108

[56] References Cited
U.S. PATENT DOCUMENTS

| | | | |
|---|---|---|---|
| 2,679,335 | 5/1954 | Bell | 222/108 |
| 2,682,975 | 7/1954 | Stoner | 222/108 |
| 3,584,917 | 6/1971 | Ullenberg | 298/7 |
| 4,426,020 | 1/1984 | Presseau et al. | 222/108 |

Primary Examiner—Leslie J. Paperner
Attorney, Agent, or Firm—Jennings, Carter, Thompson & Veal

[57] ABSTRACT

Discharge of fluid and debris onto a roadway from between the closure member and the rear of a truck body is eliminated by the use of a collection trough mounted beneath the rear of the truck body and a pivotally mounted slide member which can be selectively positioned to cover the trough while functioning as an asphalt slide or to act as a retaining wall to deflect and retain water and debris within the trough.

20 Claims, 5 Drawing Sheets

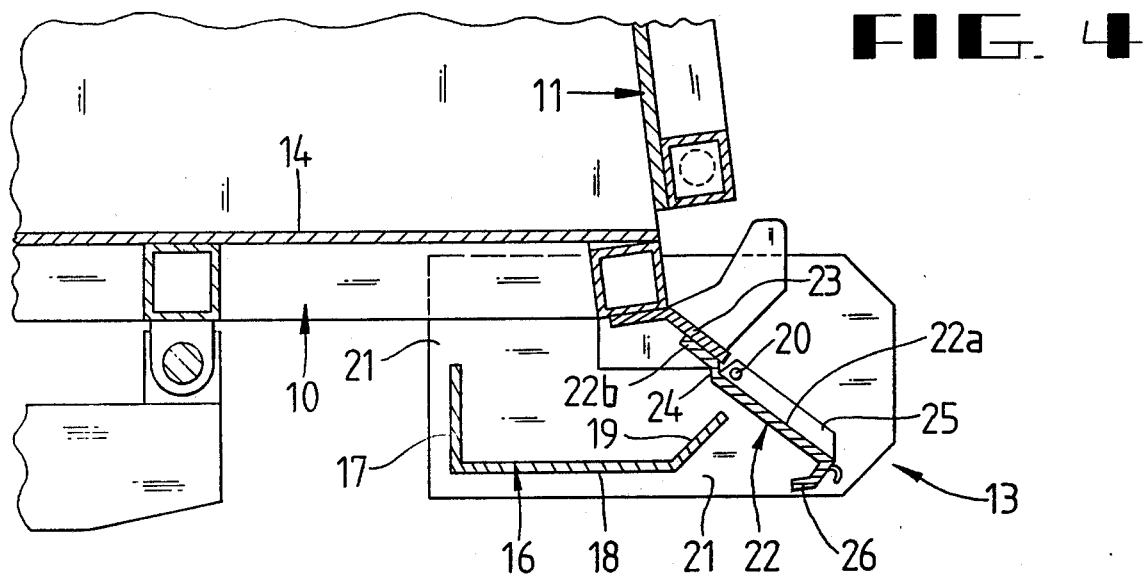
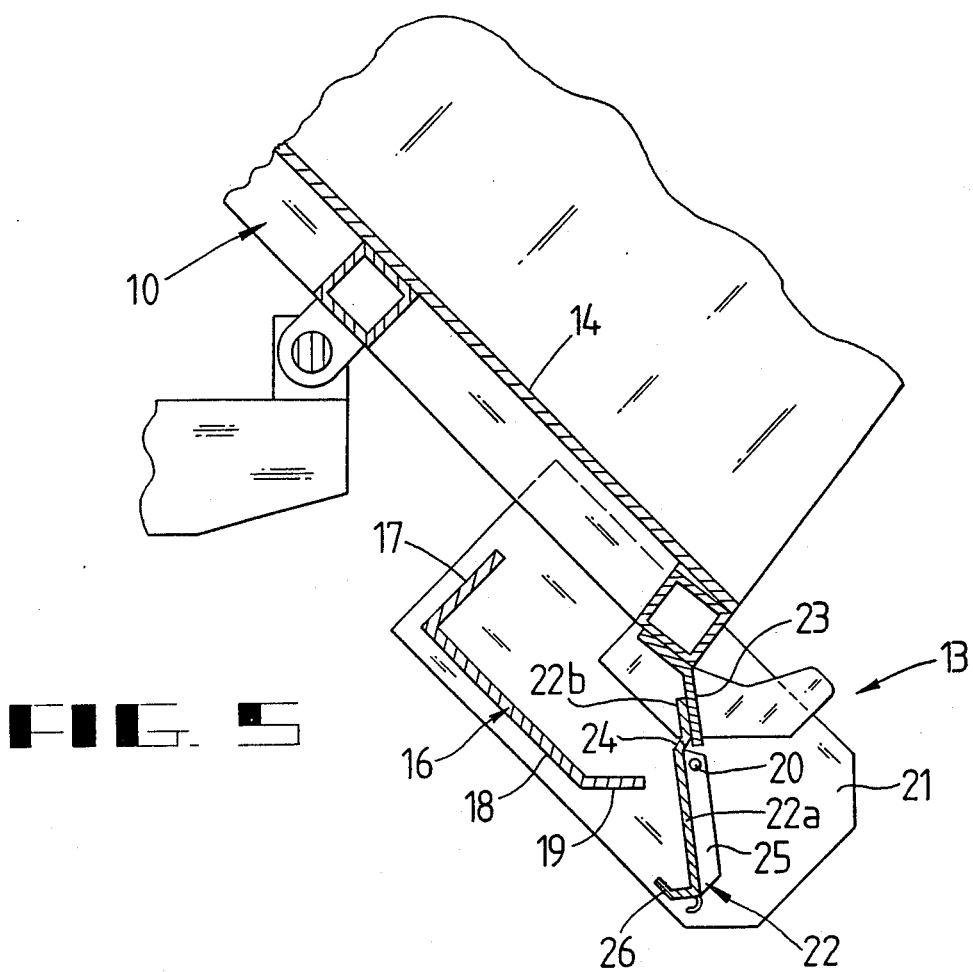

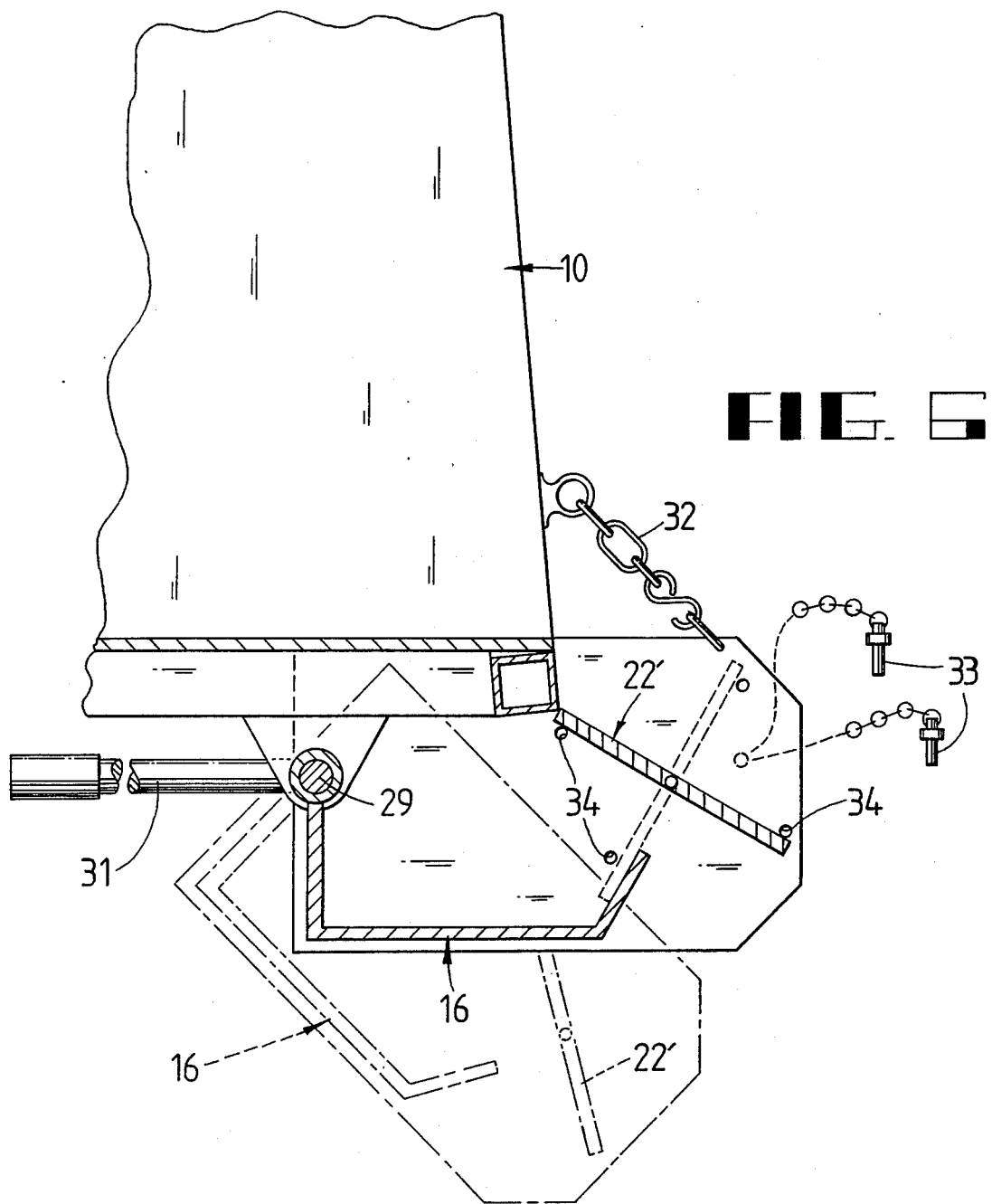

DUMP BODY DEBRIS CATCHER

FIELD OF THE INVENTION

The present invention relates to dump bodies such a those conventionally found on dump trucks and roll-on waste collection bins. In particular, the present invention relates to the seal formed between the dump body and the rear closure therefor. In even greater particularly the present invention may be described as a containment apparatus for debris which escapes from the dump body beneath the rear closure.

BACKGROUND OF THE INVENTION

Dump trucks are commonly used for hauling bulk material such as sand and gravel from quarries or storage facilities to places of use or further processing. Roll-on dump bodies serve as garbage bins or collection bins which are thereafter rolled onto the bed of a truck and transported to a site where the contents are disposed of or processed. Each of these types of dump bodies have rear closure members or tailgates which are displaced to permit the dump body to be raised to empty its contents. Commonly, the tailgates do not form a perfect seal with the dump body, thus water and other fluids as well as small particles of debris can escape between the body and the tailgate. It is a common sight to see dump trucks leaving a trail of fluid or to see windshields pitted by debris from such trucks. Heretofore no effort has been made to confine the debris and fluid to prevent the dispersal onto the roadway, although various municipalities are requiring trucks of this type to use roadways that are not heavily travelled or through residential areas. Dump trucks often are provided with asphalt skirts which extend downwardly and rearwardly; however, such structure merely serves to guide the fluid or debris toward the roadway.

SUMMARY OF THE INVENTION

It is the object of the present invention to capture fluids and debris which have escaped between the dump body and tailgate, thereby preventing contamination of the roadway with foreign objects or material.

Yet another object of the invention is to provide a means for preventing captured debris from falling from the vehicle.

These and other objects and advantages are achieved by my invention through the utilization of a movable skirt in conjunction with a collection plenum or trough. The trough is mounted to the dump body beneath the junction of the dump body and the tailgate such that fluids and debris will fall thereinto. The movable skirt is mounted for pivotal motion in spaced relation to the trough and extends across the width of the dump body and the width of the trough such that the skirt may pivot between a first position covering the trough and a second position opening the trough to receive fluids and debris. In another embodiment, the trough may be pivotally mounted to discharge debris and fluids as required.

BRIEF DESCRIPTION OF THE DRAWINGS

Apparatus embodying features of my invention are depicted in the drawings appended hereto which form a portion of this disclosure and wherein:

FIG. 4 is a partial sectional view of my invention showing the movable skirt in a non-transport position;

FIG. 5 is a partial sectional view showing the dump body raised to empty the contents thereof and any contents in my invention;

FIG. 6 is a partial sectional view of an alternative embodiment wherein the trough member is pivotally mounted to the truck body.

DESCRIPTION OF A PREFERRED EMBODIMENT

Figure 1:
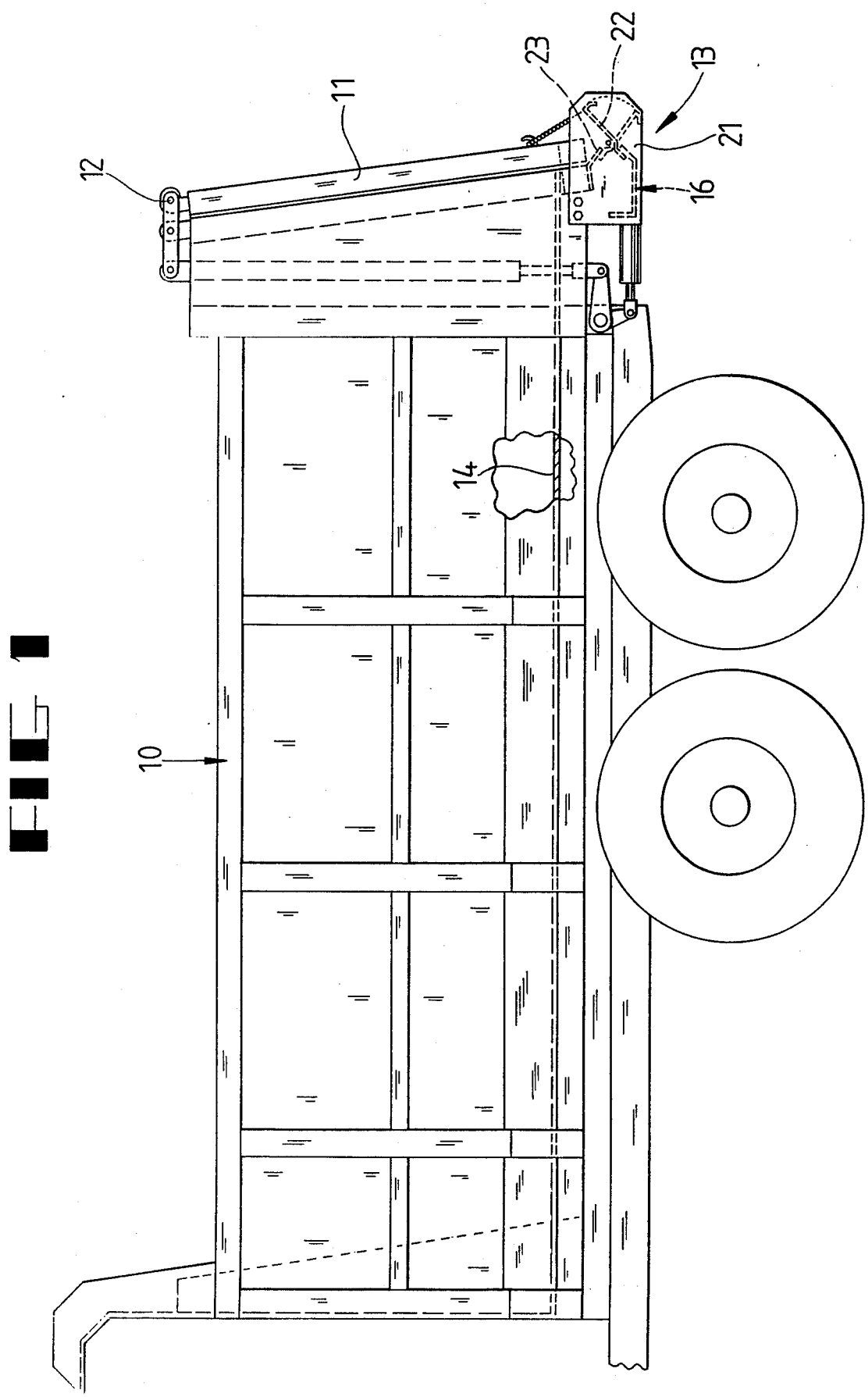
FIG. 1 is a side elevational view of my apparatus utilized on a dump body.

Referring to the drawings for a better understanding of the invention, it may be seen that the present invention is an improvement for use on truck bodies, particularly dump bodies. In FIG. 1 a dump body 10 having a tailgate 11 supported by a hinge mounting 12 at the top thereof is utilized with one form of my apparatus 13. The truck body 10 includes a floor member 14 against which the tailgate 11 rests in its closed position. In as much as a complete seal is not formed in conventional bodies, there is an appreciable amount of leakage of fluids and particulate matter between the floor member 14 and the tailgate 11.

Figure 2:
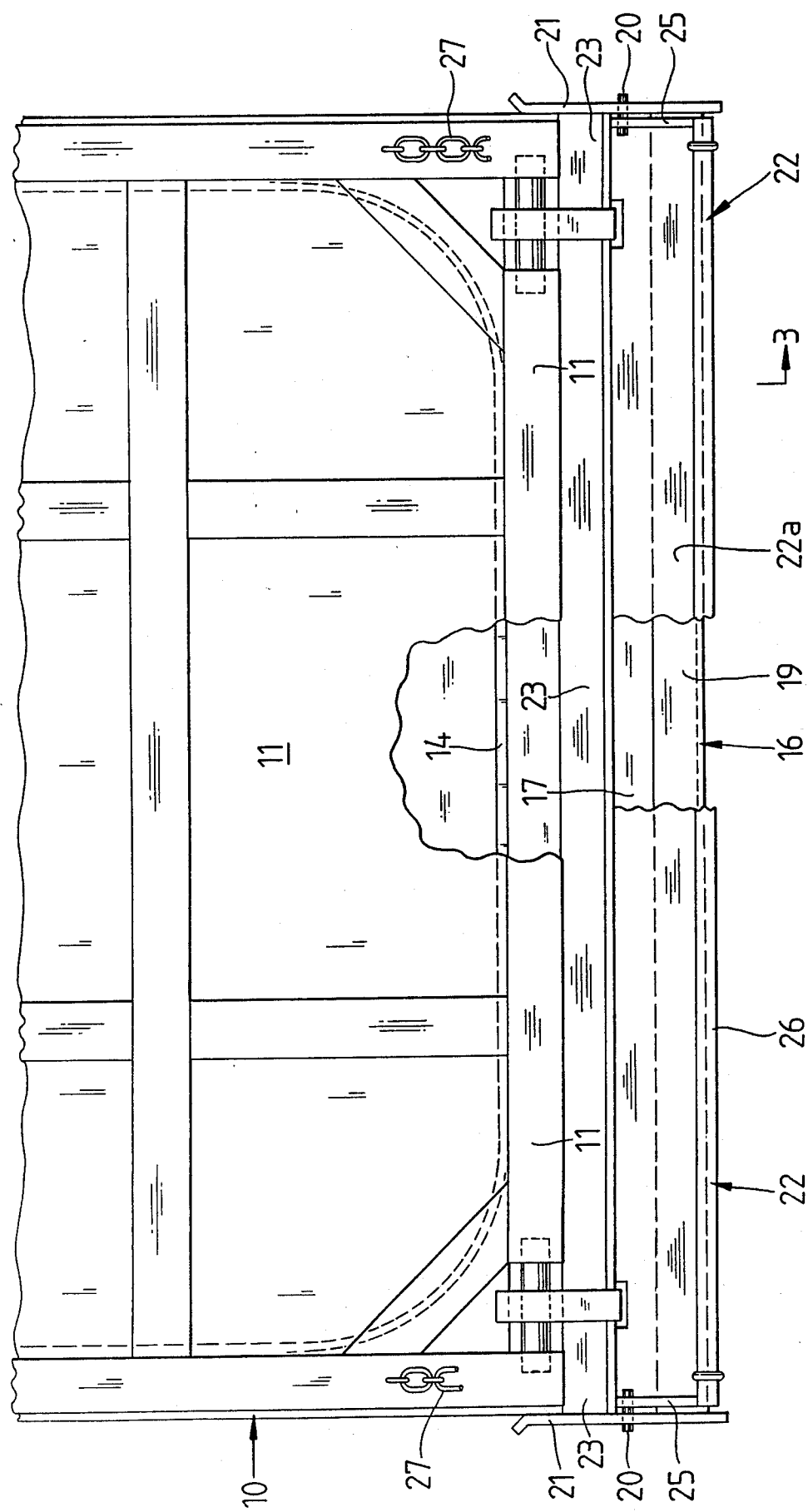
FIG. 2 is a partial rear elevational view of a dump body with my invention attached thereto.

My invention utilizes a trough-like member 16 having a forward wall 17 extending beneath the dump body 10, a bottom portion 18 extending rearwardly from the forward wall 17 and a rear wall 19 extending rearwardly and upwardly from the bottom portion 18 beneath the interface between the body 10 and tailgate 11. A pair of end panels 21 are secure to the truck body 10 and form the ends of the trough-like member 16 which extends transversely of the body 10. End panels 21 support a movable slide member 22 which pivots on a pair of pins 20 spaced from rear wall 19. The slide member 22 serves a two-fold purpose. When in the up position as shown in FIGS. 2 and 4, the slide member 22 functions in the same manner as the conventional asphalt slide. In this position, the slide member 22 abuts the underside of a stop 23 and is inclined downwardly and rearwardly over the trough 16 such that the trough 16 is essentially closed. It is noteworthy to mention that the pivot axis of the slide member 22 is positioned such that the slide member 22 is divided along a longitudinal line into a major portion 22a and a minor portion 22b having a size and weight ratio of about 2:1 such that the slide member 22 is held by gravity in the up position as shown in FIGS. 2 and 4. It should also be noted that the minor portion 22b is stepped as at 24 to provide greater rigidity along the length of the slide member 22. The slide may also have a down turned portion 26 along the rearmost edge thereof as a strengthening member and a pair of upturned flanges 25 which carry the pins 20.

Figure 3:
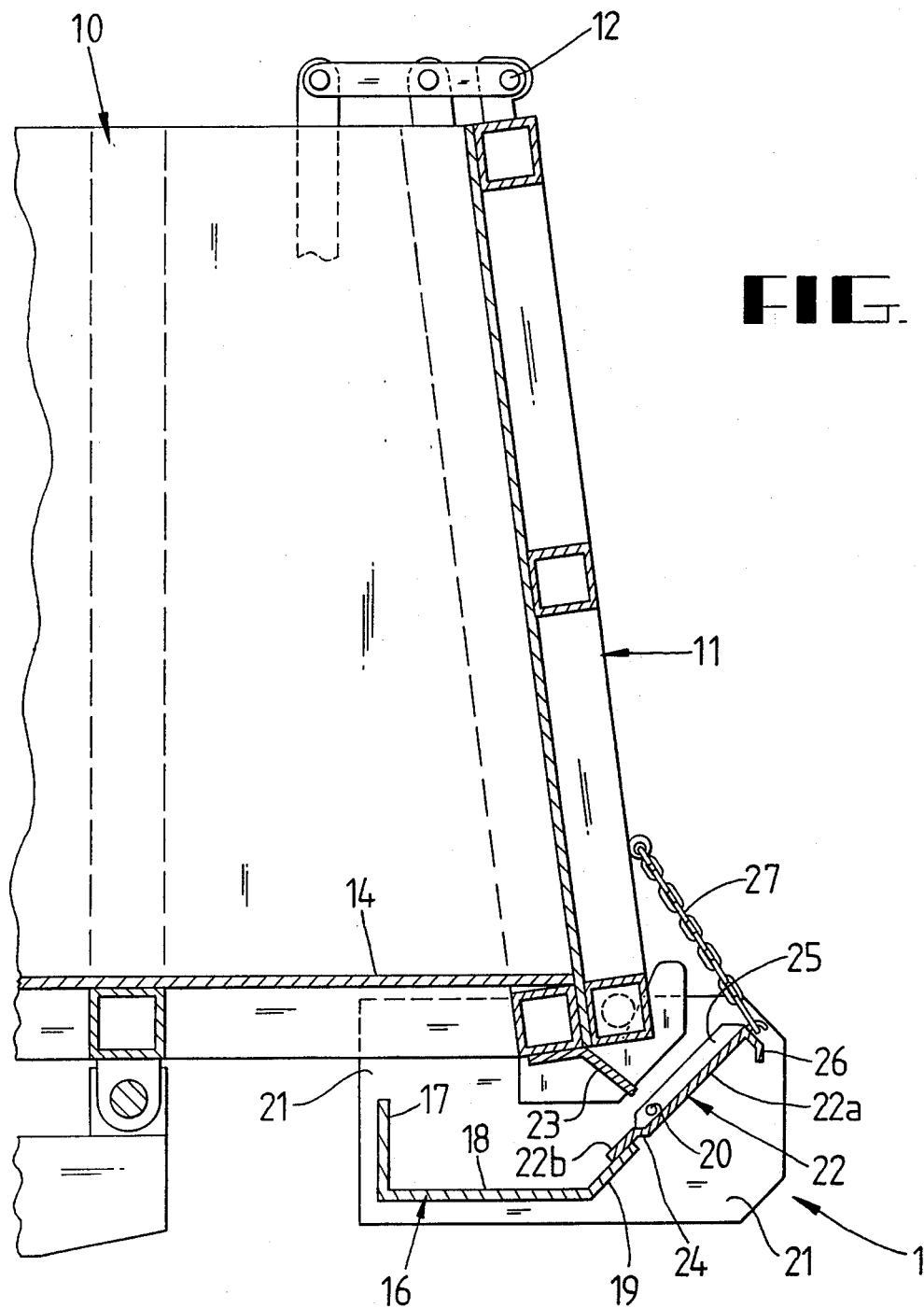
FIG. 3 is a sectional view taken along line 3—3 of FIG. 2 showing the movable skirt in the transport position.

Minor portion 22b abuts against the inside rear wall 19 when the slide member 22 is in the travel position as shown in FIG. 3. In this position, the major portion 22a extends upwardly and rearwardly beyond the junction of the tailgate 11 and floor 14 such that debris escaping therebetween is directed into trough-like member 16. The slide member 22 is held in this position by a chain 27 near each end of the slide member 22.

A second embodiment is shown in FIG. 6 which may be used with dump bodies, roll-on containers such as are used for trash collection, refrigerated trucks or the like.

In this embodiment, the trough-like member 16 is mounted for pivotal motion on a shaft 29 at the forward wall such that the trough-like member 16 can swing downwardly about the shaft to empty the contents thereof. A handle 31 is provided to assist in the movement of the trough-like member to the selected position. A set of chains 32 hold the trough-like member 16 in its raised position during travel. Also the slide member 22' is mounted for rotation about its longitudinal axis rather than offset from this axis. A set of pins 33 are provided for insertion into apertures 34 to hold the slide member 22' in its selected position.

From the foregoing, it may be seen that I have provided a useful device which substantially eliminates the spillage of fluids and debris onto the roadway by trucks of various descriptions. That is to say, with any truck body which comprises a vessel open at one end and subject to leakage. Further, the debris is discharged from the trough-like member whenever the dump body 10 is raised as in FIG. 5 or the handle 31 is operated as in FIG. 6; thus there is no accumulation within the trough-like member 16 except when desired. Also the trough-like member 16 does not interfere with the normal loading or discharge of materials from the truck in as much as the slide member covers the trough during such operations.

While I have shown my invention in various forms, it will be obvious to those skilled in the art that it is not so limited but is susceptible of various changes and modifications without departing from the spirit thereof.

What I claim is:

1. In a truck body having a rear closure such as a tailgate movable between an open position and a closed position, the improvement comprising:
   (a) a trough-like member disposed transversely beneath said truck body and said rear closure for receiving material passing between said truck body and said closure; and
   (b) a slide member extending transversely of said truck body and mounted proximal the trailing edge of said trough-like member for selective pivotal motion about an axis transverse of said truck body between a first position wherein said slide member covers said trough-like member such that the contents of said truck body may be discharged thereover and a second position wherein said slide member extends upwardly and rearwardly adjacent said trough-like member to direct material from said truck body into said trough-like member.

2. The improvement as defined in claim 1 wherein said trough-like member comprises a forward wall extending downwardly from said truck body, a substantially planar bottom extending rearwardly from said forward wall, a rear wall extending upwardly and rearwardly from said bottom and a pair of end walls on opposite sides of said truck body.

3. The improvement as defined in claim 2 wherein said rear wall is inclined at an angle of approximately 45° from said bottom.

4. The improvement as defined in claim 2 wherein said slide member pivots on a shaft mounted between said end walls in space relation to said rear wall.

5. The improvement as defined in claim 4 wherein said slide member is mounted for rotation about its longitudinal central axis.

6. The improvement as defined in claim 5 further comprising means for securing said slide member selectively in said first or second position.

7. The improvement as defined in claim 5 wherein said trough-like member is mounted for pivotal motion proximal the intersection of said forward wall and said truck body.

8. The improvement as defined in claim 4 wherein said slide member is mounted for rotation about an axis eccentric from the center line thereof such that a minor portion of said slide member covers said trough-like member in said first position.

9. The improvement as defined in claim 8 further comprising a lip extending downwardly and rearwardly from said dump body superimposed over part of said minor portion in said first portion.

10. The improvement as defined in claim 4 wherein said slide member is a plate-like member having a first longitudinal position thereof offset from the remainder thereof.

11. The improvement as defined in claim 4 further comprises an upturned edge guard affixed to each end of said slide member.

12. The improvement as defined in claim 1 wherein said trough-like member includes a rear wall extending upwardly and rearwardly beneath said slide member.

13. The improvement as defined in claim 12 wherein said slide member pivots on a shaft mounted between said end walls in spaced relation to said rear wall.

14. The improvement as defined in claim 12 further comprises an upturned edge guard affixed to each end of said slide member.

15. The improvement as defined in claim 12 wherein said trough-like member is mounted for pivotal motion proximal the intersection of said forward wall and said truck body.

16. The improvement as defined in claim 12 wherein said slide member is mounted for rotation about its longitudinal central axis.

17. The improvement as defined in claim 12 further comprising means for securing said slide member selectively in said first or second position.

18. The improvement as defined in claim 1 wherein said truck body is a dump body.

19. The improvement as defined in claim 1 wherein said truck body is a roll-on body.

20. The improvement as defined in claim 1 wherein said truck body is a refrigerator body.

* * * * *